N. CARLTON ET AL 1,497,324

MACHINE FOR MAKING ENVELOPES AND THE LIKE

Filed Sept. 6, 1923    12 Sheets-Sheet 5

Fig.2.

INVENTORS
NORBERT CARLTON
ALBERT KERSTEN
BY Stockbridge & Borst
ATTORNEYS

June 10, 1924.

N. CARLTON ET AL

1,497,324

MACHINE FOR MAKING ENVELOPES AND THE LIKE

Filed Sept. 6, 1923    12 Sheets-Sheet 11

INVENTORS
NORBERT CARLTON
ALBERT KERSTEN

BY Stockbridge & Borst

ATTORNEYS

Patented June 10, 1924.

1,497,324

UNITED STATES PATENT OFFICE.

NORBERT CARLTON AND ALBERT KERSTEN, OF LONDON, ENGLAND, ASSIGNORS TO JOHN DICKINSON & COMPANY LIMITED, OF LONDON, ENGLAND, A CORPORATION OF ENGLAND.

MACHINE FOR MAKING ENVELOPES AND THE LIKE.

Application filed September 6, 1923. Serial No. 661,195.

*To all whom it may concern:*

Be it known that NORBERT CARLTON and ALBERT KERSTEN, both subjects of the King of Great Britain, residing at London, England, have invented certain new and useful Improvements in Machines for Making Envelopes and the like, of which the following is a full, clear, and exact description.

This invention relates to a machine for making envelopes and the like from previously cut blanks, which are fed into the machine successively.

The chief object of the invention is to provide a machine that shall be as simple as possible to operate, and which shall be so constructed that it will handle a larger range of sizes, than has been generally possible heretofore.

Another object of this invention is to limit the amount of room the machine will occupy having regard to the relatively large blanks the machine will fold.

It is desirable in any adjustable machine for folding envelopes that, in changing from one size of envelope to another, there shall be no parts to be removed, but that the parts be capable of ready adaptation by adjustment to operate on a different size blank. The working of the machine is also simplified if, in changing from one size to another it is only necessary to alter one side thereof, the setting of the various moving actions at one side of each folding station being allowed to remain undisturbed, thereby retaining perfect working relationship of the various parts and effecting economy in the time necessary for effecting adjustments.

It is also desirable, when changing sizes, that as many actions as possible should be capable of movement as a single unit, thereby retaining perfect working relationship between the parts undisturbed.

A machine according to the invention is adapted to secure the before-mentioned objects and advantages, and as described the lateral adjustment is arranged to take place on one side at the first folding station, and on the other side at the second folding station. It will however be understood that the invention is not confined to this arrangement as under certain conditions of working it may be necessary or desirable to reverse the sides that are adjustable or both sides may be constructed for adjustability.

One of the chief features of the present invention resides in the use of incomplete discs for effecting the transfer of the blank. The term "arc castings" appears to more correctly describe these discs and they will hereinafter be so referred to.

Our invention comprises certain improved movements and actions as included in the description thereof hereinafter appearing, the consecutive actions of the mechanism illustrated being set forth in order to enable the invention to be clearly understood and carried out.

Shortly stated, the following is the sequence of operations:—

1. Feeding the blank and bringing the same to rest at the first folding station.
2. Depressing the blank to a lower plane.
3. Folding the side flaps over the body of the envelope.
4. Transferring the partly folded blank to and bringing the same to rest at the second folding station.
5. Again depressing the blank to a lower plane.
6. Folding the end flaps over the side flaps.
7. Transferring the folded envelope blank to delivery action.

The invention will now be more fully described with reference to the accompanying drawings, in which:—

Figures 1ᵇ and 1ᶜ are also partial elevations of the same side of machine, but showing the feeding end of machine.

Figures 2ᵇ and 2ᶜ are also partial plans showing the feeding end of machine.

Figure 9 is a detail view of one of the fingers for progressing the blank.

Figure 10 shows the method of hinging or mounting the same on the travelling chain.

The same reference numerals are used for the same parts on the different views and, for the sake of clearness, details not necessary for the proper understanding of the invention have been omitted from the drawings.

The machine according to this invention is designed to fold blanks of either the ordinary commercial shape with four angular or other shaped flaps, or blanks to form bag shaped envelopes in which the two side flaps are caused to overlap at a centre seam, and are secured together by a line of gum, the bottom and sealing flap being afterwards folded over the side flaps; or in fact, any envelope of rectangular shape.

The invention concerns more particularly first the method of folding the flaps, and secondly the method by which the machine is altered to fold blanks of varying size.

It may be observed that any appropriate method of feeding the blanks may be adopted as will be readily known and understood by those engaged in the art.

In dealing with blanks to be fed to envelope folding machines, it has been customary to provide a pile or wad of blanks at one end of the machine and to successively draw therefrom as the operation of folding proceeds, the pile or wad being adapted to compensate in height for the blanks withdrawn therefrom; the withdrawal being effected by suction picker or other means, and the blank passed into the machine by gripping rolls.

According to another method, blanks are arranged in a pile or wad over entry rolls and periodical removal effected from the bottom of the pile, the blanks being drawn between pairs of spring mounted rollers whereby they are passed into and so through the machine.

Another method involves drawing the blank from the front of a wad or pile disposed on edge and dealing with the top or bottom edge foremost.

In the accompanying drawings, the machine is shown as constructed for hand feeding, but any of the well known mechanical feeding devices may be associated therewith if desired.

The lay board or feeding table 3, may be constructed of one board, or sheet of metal, but for ease in adjusting the machine to fold various sizes, we have shown same composed of a number of adjustable battens 4, 5, 6, 7 of varying widths adjustably mounted on stays 8 and 9 at back and front of lay board.

The machine comprises a pair of frames 10 and 11 rigidly held apart by stretches (not shown) at base, and by bridge castings 12, 13 at top. Frames 1 and 2 are fixed to ends of frames 10 and 11 at feed end of machine.

Suitably disposed over bridge casting 12 and vertically over frames 10 and 11 and fixed thereto are side frames 14, 15. Inner frame 16 is rigidly fixed to, and inner frame 17 is slightly fitted in, the bridge casting 12. The frame 17 is fitted into a recess in the bridge casting and held therein so as to be slidable laterally in relation to the machine, by plates 18, 19. Fixed to underside of frame 17 is an internally screw threaded block 20, through which the screw threaded shaft 21 works.

A slot in bridge casting 12 allows free lateral movement of block 20 and when the latter is so moved a similar movement is imparted to the frame 17. Gear wheel 22 and chain wheel 23 limit the lateral movement of the shaft 21 which however is free to revolve in frame 14 and block 20. Gear wheel 24 rigidly fixed to shaft 25 meshes with gear wheel 22 and hand wheel 26 is rigidly fixed to shaft 25 which is also free to revolve in frame 14.

Thus any movement of hand wheel 26 communicates a lateral sliding movement to the frame 17.

Driving shaft 27 passes through machine, and is journalled in bearings 28.

Gear pinion 29 and bevel wheel 30 are keyed to shaft 27, bevel wheel 31 is keyed to shaft 32 which is revolubly mounted at 90° to shaft 27 and by meshing bevel wheel 30 with bevel wheel 31, shaft 32 is made to revolve in unison with shaft 27.

Meshing with gear pinion 29, is gear wheel 33. Gear wheel 33 is keyed to shaft 34 which is revolubly mounted in frames 14, 15, 16 and 17 and is located laterally in frame 16 by arc casting 35 and cam 36. A splined key 37 in shaft 34 passes through and is slidably fitted in bush 38. Bush 38 is revolubly fitted in frame 17, and arc casting 39 and cam 40 locate laterally the bush casting 38 in frame 17. Any movement therefore of frame laterally, developed by turning hand wheel 26, causes bush 38 to travel along shaft 34, the arc casting 39 and cam 40 retaining the same relative position with frame 17.

Rigidly fixed to shaft 34 adjacent to frame 14, is cam 41 and adjacent to frame 15, cam 42. Revolubly fitted in bearings on frames 17 and 16, are shafts 43, 44. Attached to shafts 43, 44 are side flap folders 45, 46 operated by levers 47, 48 actuated by the respective cams 40, 42.

Pins 49, 50 revolubly fitted in frames 16, 17 carry chain wheels 51, 52 these chain wheels carrying chains 53, 54 for supporting and conveying the blanks.

Rigidly fixed to gear pinion 29 is a chain wheel 55 which drives chain 56. Chain wheel 57, driven by chain 56 is connected to gear 58 and meshing with gear 59 drives chain 60. Chain wheel 61 driven by chain 60 drives shaft 62. Shaft 62 is revolubly mounted in bearings 74, 75 and carries at one end rigidly fixed chain wheel 65. A splined key fitted to shaft 62 and operating through key-wayed bush 66, carrying chain wheel 67, permits lateral adjustment to be made between chain wheels 65 and 67.

Endless chains 53 and 54 are of such a length that they make one complete revolution to each two revolutions of the machine. Two spring controlled and hingedly mounted fingers 68, 69 are mounted in each chain and are arranged so as to constitute two pairs, one pair being in operation at each revolution of the machine.

Chain wheel 23 carrying chain 70 drives chain wheel 71 fixed to screwed shaft 72 and the latter by operating through the fork casting 73, controls the lateral movement thereof.

It is necessary, when effecting the adjustment laterally of the chain 53 for the purpose of dealing with larger or smaller blanks, that said chain be maintained in parallel relation with its coacting chain 54 and this is effected by causing the synchronous action of the screwed shafts 21 and 72 by means of the chain connection 70.

In order to allow for stretch of chain 70, bearings 74, 75 carrying shaft 62 are spring and screw controlled and fork casting 73 swings to any movement of shaft 72 caused by adjustment of hand wheels 76, 77 and springs 78, 79.

Cams 41, 36 operate to depress levers 80, 81, which are connected by link motion to upright sliding rods 82, 83, a bridge piece 84 being fastened to the top ends of the rods.

First station folding blades 85, 86 are securely and adjustably fixed to the bridge piece 84 and are adapted to operate between and close up to frames 17, 16 respectively.

Channel iron units 87, 88 are securely fixed to tops of frame 17, 16 and to the inside of these units distance pieces 89, 90 are arranged which fit close up to folding blade path of travel. At the point where the chain wheels 51, 52 operate, the base of the channels is cut or slotted to allow of the passage of the chain wheels and chains for the return stroke of fingers on chain.

It will be thus observed that the endless chains pass one each side over chain wheels with spring and screw arrangement for keeping chains taut; that these chains run in channels the surface of which is higher than chain line, that the spring controlled fingers only project above channels, and that any blanks placed on the top surface of channels are only given a forward motion, when the rear edge of blank makes contact with upstanding spring controlled fingers carried on travelling chain.

The duty of chain fingers is to propel the blank forward, and when the blank has arrived at the position where the first fold is to take place, means are provided to depress the finger below the path of the blank. The point of depression will vary with blanks of varying length. In order to meet this requirement, the outer channel flanges 87$^x$, 88$^x$, are of reduced height and compensating angle pieces 91, 92 are applied thereto, the said angle pieces being adjustable along the flanges 87$^x$, 88$^x$ by means of bolts which pass through slots (one of which is seen at 91$^x$ Figure 1) in the angle pieces and are screwed into the channel flanges 87$^x$, 88$^x$ thus presenting a deflecting means for the oncoming spring controlled finger, which can be set as required.

Shaft 93, revolubly mounted in bearings 96, 97 carrying arc castings 94, 95 and being driven by gear wheel 98 meshing with gear wheel 33, has a splined key adapted to engage a key-way cut in arc casting 94. Arc casting 95 is rigidly fixed to shaft 93. Arc casting 94 is adjustably fixed and is moved laterally in position to suit the particular size of blank being folded, and so as to co-act with arc casting 39 secured to bush 38, arc casting 95 being in co-acting relation with arc casting 35.

Figure 1:
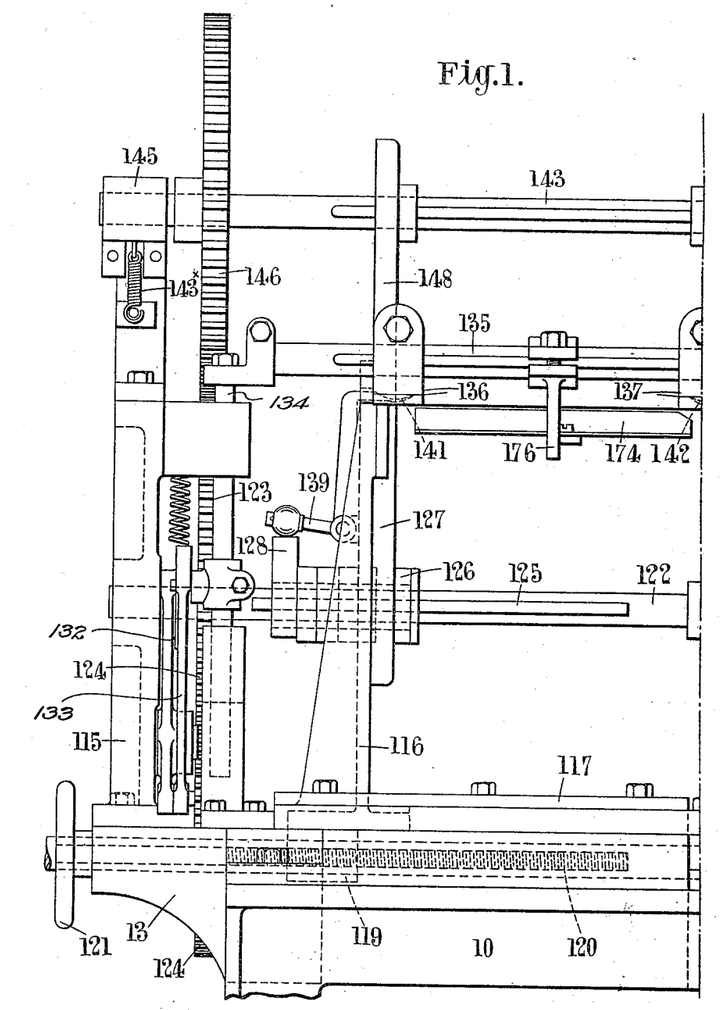
Figures 1 and 1ª are partial elevations, showing the folding section of the machine.

The normal position of folding blades 85, 86 is at the level shown in Figure 1 while the fingers 68, 69 are forwarding the blank to the first position of rest before folding and where the blank is arrested and registered by stops (not shown.) It will be realized that in this position the ends of folding blades are about one inch short of the centre line of arc casting contact, and that the ends of blades are thinned down to permit of their missing the arc castings when same are making contact, and that in this position, the blank is also as shown in diagrammatic form at Figure 6 where the blank 99 is lying along the top of channels (not shown) and distance pieces 89, 90 with the leaves of side folders 45, 46 in an outward position, folding blades 85, 86 being just above the plane of blank.

As revolution progresses the arc castings swing over from the position shown in Figure 1 and after certain operations (to be hereinafter described) take place the blank is gripped between the upper and lower first station arc castings whereby it is conveyed to the forwarding rollers 100, 101 and 102, 103 and 104.

Shafts 93 and 143 which carry the upper arc castings of first and second folding stations respectively are held in yielding engagement with the complementary shafts of the lower arc castings by means of springs 93× and 143× respectively.

The lower forwarding rollers 102, 103 and 104 are provided with gears which working through train 105, 106 and 107 driven from gear wheel 33, drive the said rollers at the same circumferential speed as the arc casting periphery.

In operation it is usually the practice to forward the blanks tail foremost, and when mechanical gumming arrangements are used in the machine, or when the blank is laid on the feed board with wet gummed flap, it will be necessary to raise the upper rolls 100, 101 so that the wet gummed flap may pass through without coming into contact therewith.

To this end the said rollers 100, 101 are mounted in a lever 112 which is mounted on the rocking shaft 111. The latter is operated by the lever 110 which in turn, receives motions from the slotted link 109 the bowl 113 on the latter being in operative relation with the cam 108 on the shaft 93.

Figure 8A:
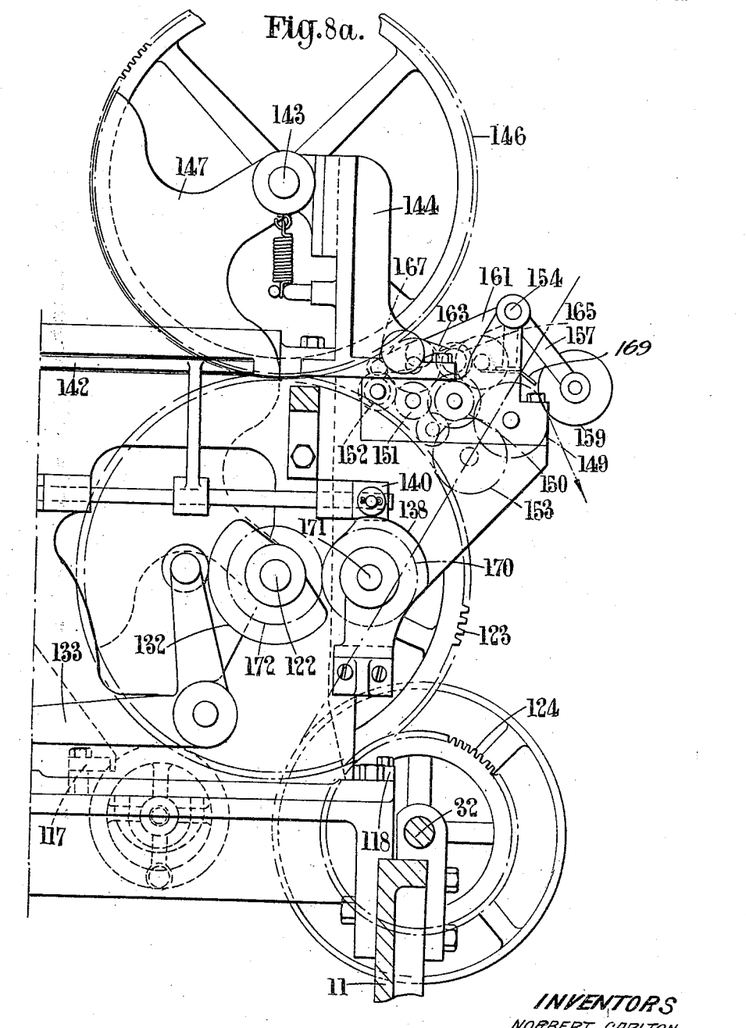

The second folding station mechanical arrangement is somewhat similar to the first station arrangement. Frames 114, 115 are rigidly secured to bridge casting 13. Frame 116 is slidably fitted into recess in bridge casting and held therein by plates 117 and 118 (Figure 8ᵃ).

The frame 116 is moved by means of the screw threaded shaft 120 which works through the threaded block 119 rigidly fixed to the underside of the said frame 116. Upon the shaft 120 being operated by the hand wheel 121, the required spacing between the frames 116 and 114 may be obtained and the machine accommodated to the size of envelope being folded.

Shaft 122 is revolubly mounted in frames 114, 115, 116 being driven by gear wheel 123 fixed thereto, and meshing with gear pinion 124 fixed to shaft 32. Splined key 125 fitted to shaft 122 is slidably fitted through bush 126. Arc casting 127 and cam 128 limit the lateral movement of bush 126 which is revolubly fitted through frame 116. Arc casting 129 is rigidly fixed to shaft 122 and closely adjacent to frame 114.

Cam 129× operates to depress lever 130 which is connected by link motion to vertical rod 131. A similar cam 132 operates lever 133 and through link motion vertical rod 134 (Figures 1, 1ᵃ, 2 and 8).

Bridge rod 135 is thereby given a rise and fall motion carrying with it the second station folding blades 136, 137.

Figure 1A:
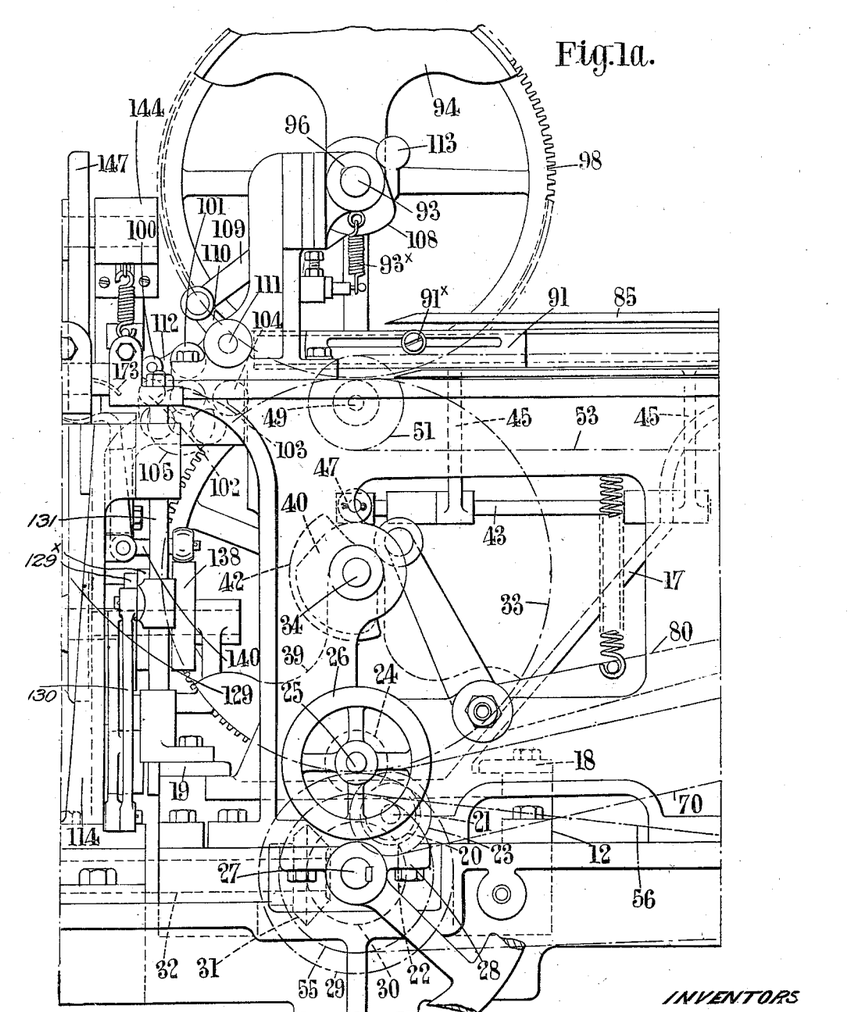
Figure 1B:
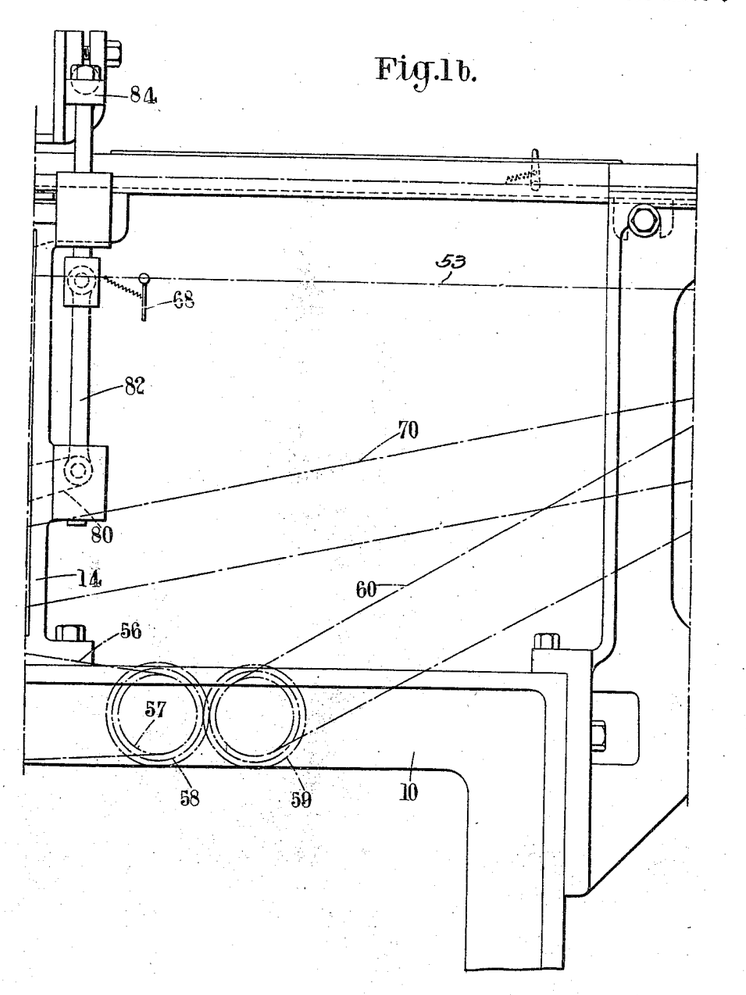

Cams 128, 138 operating levers 139, 140 move side folders 141, 142 (Figures 1 and 1ᵃ).

Cam 138, and gear wheel 170 are rigidly secured to revolubly mounted shaft 171 and are driven by intermeshing gear wheel 172 rigidly secured to shaft 122.

Shaft 143 is revolubly mounted in bearings 144, 145 and is driven by gear wheel 146 meshing with gear wheel 123. Rigidly fixed to shaft 143 and operating adjacent to bearing 144 is arc casting 147 and adjustably mounted on splined key-way in shaft 143 is arc casting 148. Lower forwarding rollers 149, 150, 151, 152 are all geared to run at correct surface speeds by means of gear pinion 153 meshing with gear wheel 123 and gears at ends of rollers. Shaft 154 is rigidly fixed in brackets 155, 155× (Figures 2, 2ᵃ) and hingedly depending from shaft 154 are the levers 157, 158 which carry the co-acting discs 159, 160 and the lever 161, which carries the brackets 162, 163 on which are revolubly mounted co-acting rollers 164, 165, 166 and 167.

Figure 2:
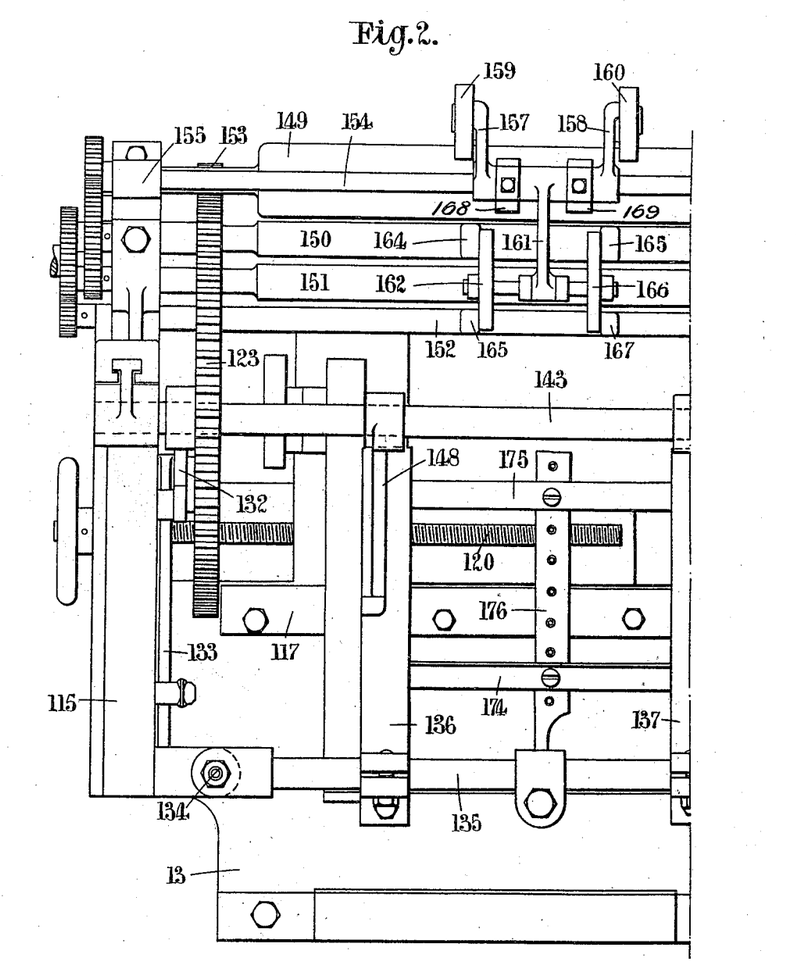
Figures 2 and 2ª are partial plans showing the folding section of machine.
Figure 2A:
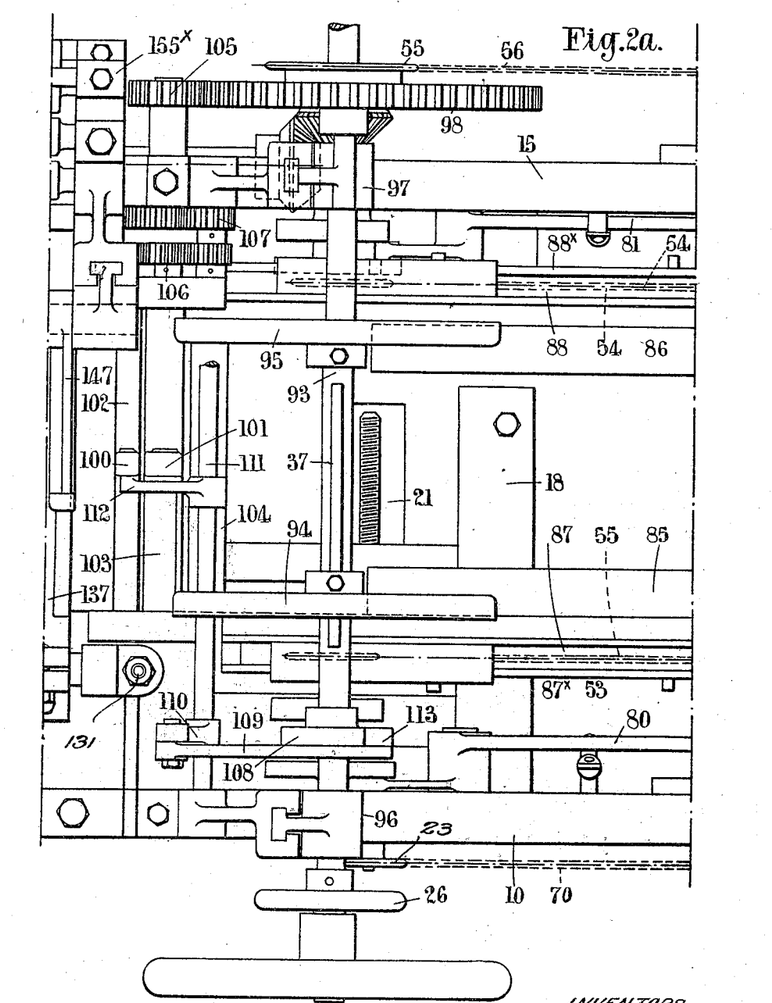

Also adjustably fixed to shaft 154 are deflecting brackets 168 and 169 (Figure 2).

It will be noticed in the second folding station that here also the ends of the folding blades are finished about one inch short of the centre line of arc contact and that the ends of the blades are thinned down so as to miss the arcs when same are in position of contact as shown in Figures 1, 1ᵃ and in the same manner as performed at the first folding station.

That portion also of side folders, 45, 46 and 141, 142 that comes within the peripheral line of the arc castings is also thinned down to miss the sweep of the latter. Guide plate 173 is provided for facilitating the transfer of the blank from the first to the second folding station.

Figures 1C, 9, 10:
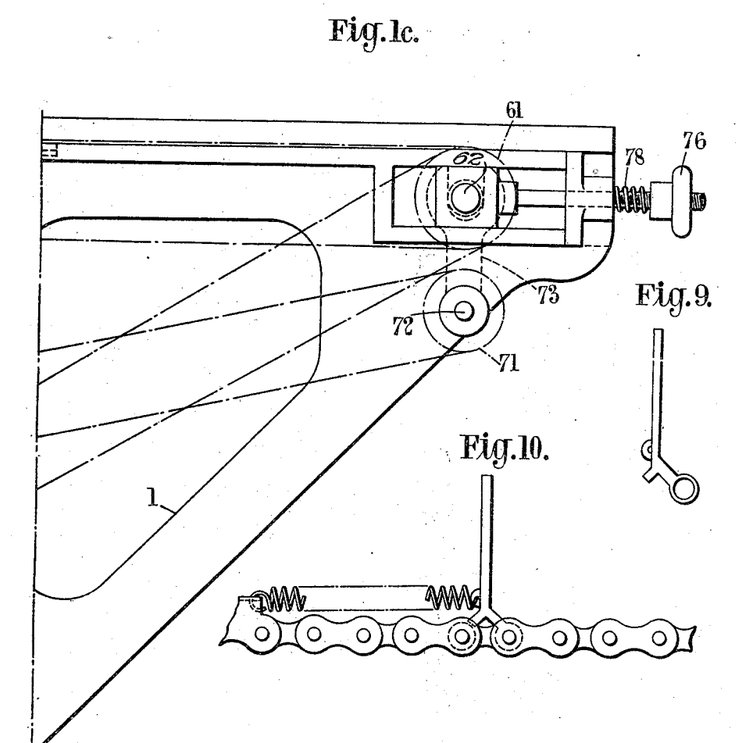
Figure 11:
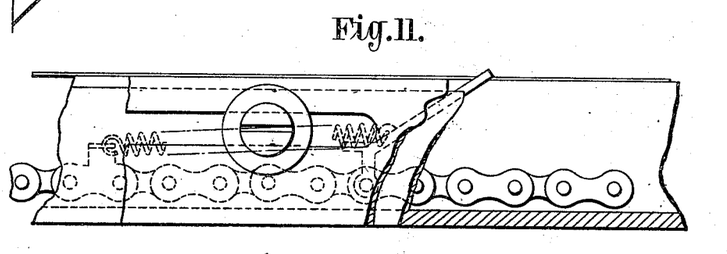
Figure 11 is a view illustrating diagrammatically the deflecting action of the angle stops.

The operation of our invention is as follows:—The envelope blank 99 Figure 2ᵃ on lay board at feeding end of machine is caught by the spring controlled fingers, 68, 69. (See detail Figures 9, 10 and 11 particularly) and propelled in position over frames 16, 17 and under folding blades 85, 86 (Figures 1ᵃ and 2ᵃ). Guides (not shown) adapted to retain the blank in its correct position are provided as required, and in accordance with the shape of the blank.

Figure 2B:
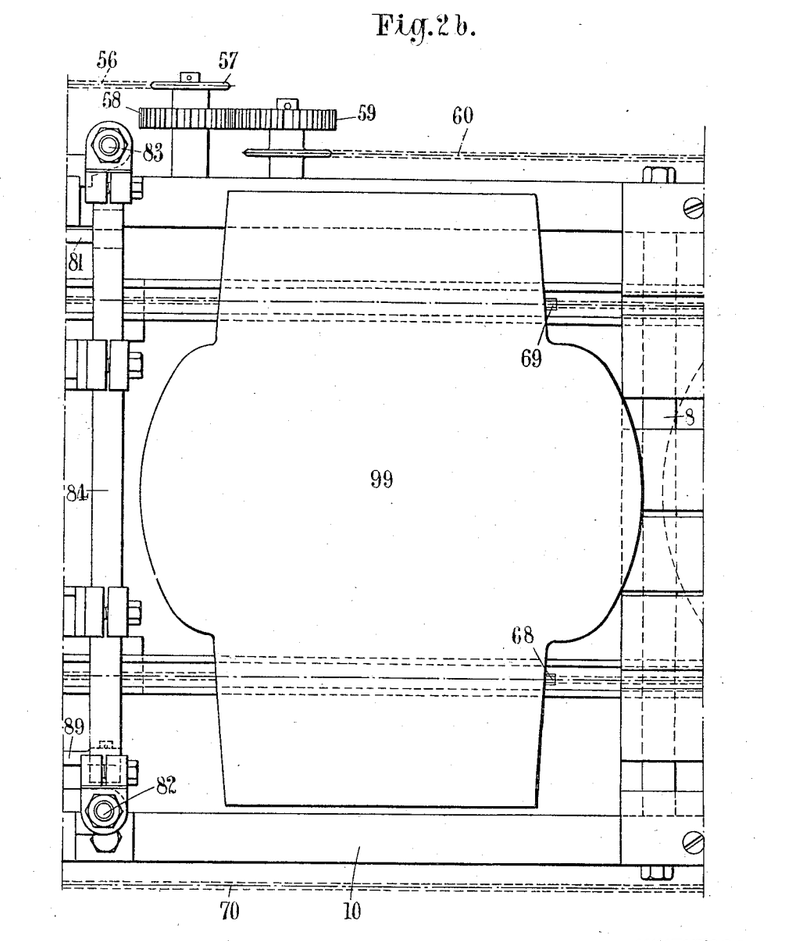
Figure 2C:
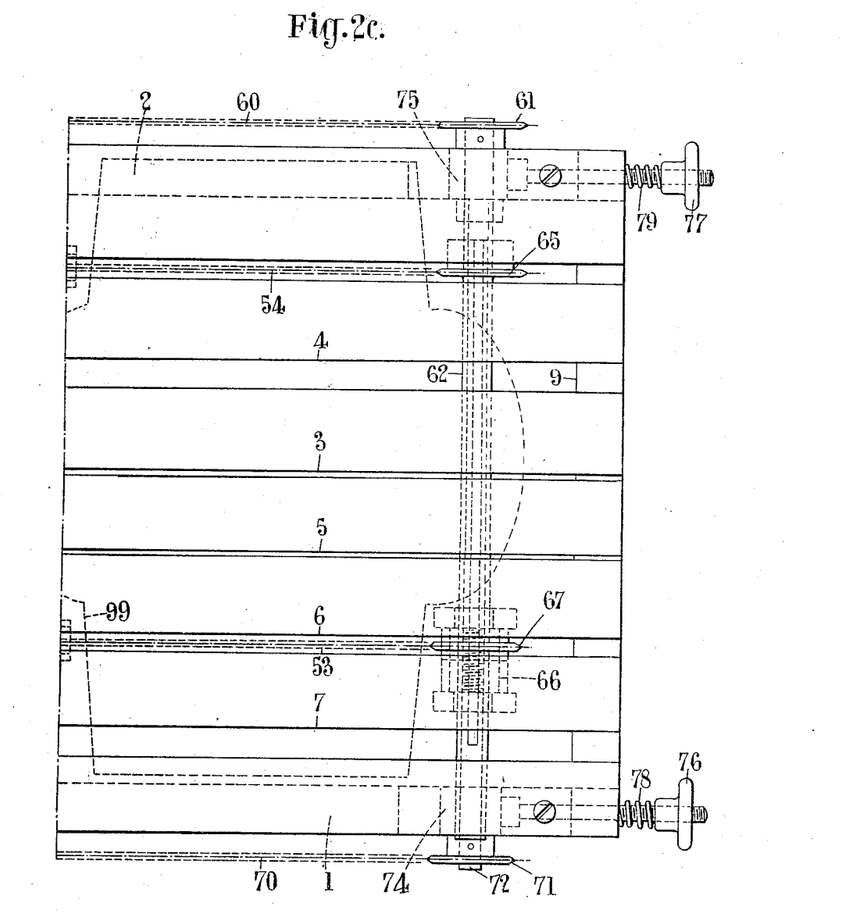

In Figure 2ᶜ the laying on position of the blank is indicated in dotted line and in Figure 2ᵇ in full line the blank is shown as having been carried forward and about to enter under bridge 84 preparatory to being acted upon by the folder blades 85, 86. When the blank arrives at the position of end flap creasing or folding stops (not shown) are adapted to arrest the progress of the blank and the propelling fingers 68, 69 are depressed or deflected to a position below the plane of the blank by the adjustable angle pieces 91, 92 on the channel units or supports 87, 88.

It will be understood that the movements of the folding blades, side folders and arc castings, are of a synchronous character, and that the position of the fingers 68, 69 and the arc castings at the first and second folding stations must bear a definite relation the one to the other and that the timing must be such as will ensure the correct progress of the blank through the successive operations of folding, of transfer from one station to another, and of delivery from the machine.

In accordance with this synchronously arranged mechanism, the blank on arrival under first station folding blades, and on being arrested, by the stops, is depressed between frames 16, 17 by blades 85, 86 this operation causing the side flaps of blank to assume an upright position, and as the blades are disposed to enter between frames with only paper thickness clearance between the respective frames and blades, the crease or bend formed thereby is quite sharp and square, this being assisted by the blades bringing the blank down so as to almost grip same between themselves and the projecting surfaces of under frames. The projecting portions of frames are so arranged that they stop short of the peripheral line of arc castings 35, 39.

The side folders 45, 46 are timed to close inwardly as soon as the folding blades 85, 86 have completed their downward action and thereby cause the upstanding side flaps to assume an overlapping position (Figure 8) encircling the folding blades, the respective movement of folding blades being so arranged and timed that the particular flap that it is desired should be the outer flap assumes the correct position.

It may be observed that the arc castings on shafts 34 and 93 are timed to make contact at extreme forward end of blank and thereby grip the folded blank at each side, and where the folding blades have stopped short, the revolution of the arc castings in contact drawing the blank from the folding blades, at the same time sharply creasing and conveying the blank to the forwarding rollers 102, 103 and 104 and between these rollers and rollers 100 and 101. The rollers 101 and 100 may be operated so as to lift during the passage of the blank under the same should either of the flaps be provided with wet gum, the cam 108 if desired being adapted to effect the said lift.

Figure 5:
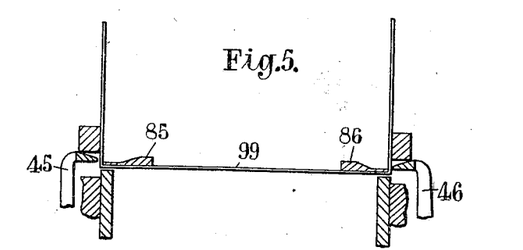
Figure 6:
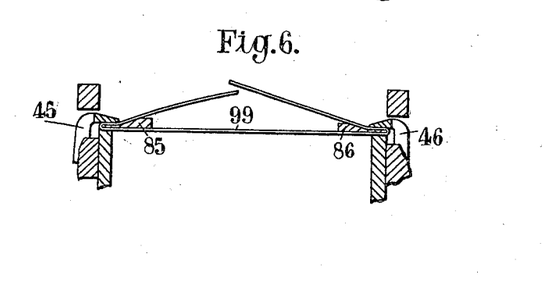
Figure 7:
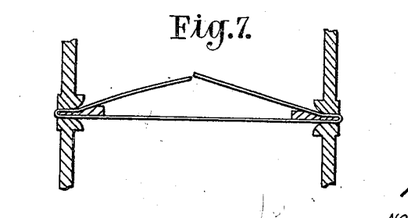

The operation of folding will be rendered clear if reference be had to the diagrammatic views, Figures 4, 5, 6 and 7. In Figure 6 of the blank 99 is shown in readiness for the first operation of folding the descent of the folding blades 85, 86 having the effect of turning up of the side flaps as shown in Figure 5. In Figure 6 the side flap folders 45, 46 are shown in action the side flaps having been thereby turned over the folding blades and encircling the latter. In Figure 7 the arc castings 35, 39, 94, 95 are shown in the act of drawing the folded blank off the folding blades, the relationship of the blades and the arc castings respectively at this position being clearly indicated. It must be understood in viewing Figure 7 that the folding blades stop short of the contact line of the arc castings and that the latter only grip the blank at that point, the withdrawal of the blank from the blades being thereby facilitated.

Figures 3, 8:
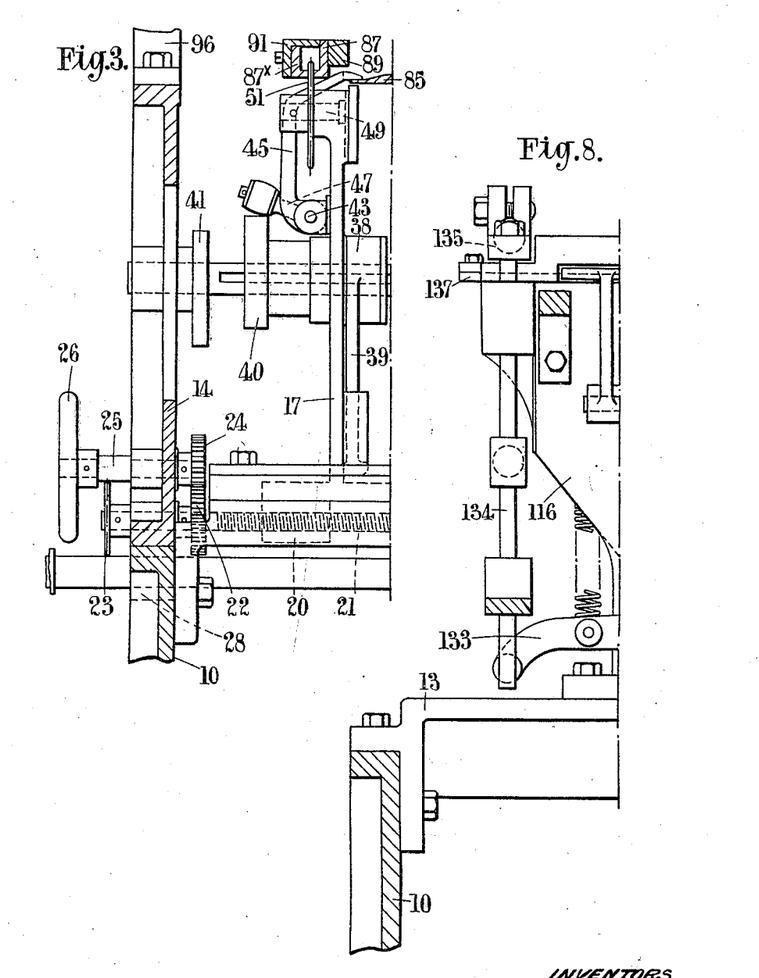
Figures 3 and 3ª are part sectional elevations showing the first folding section.
Figures 8 and 8ª are part sectional elevations showing second folding station.
Figure 3A:
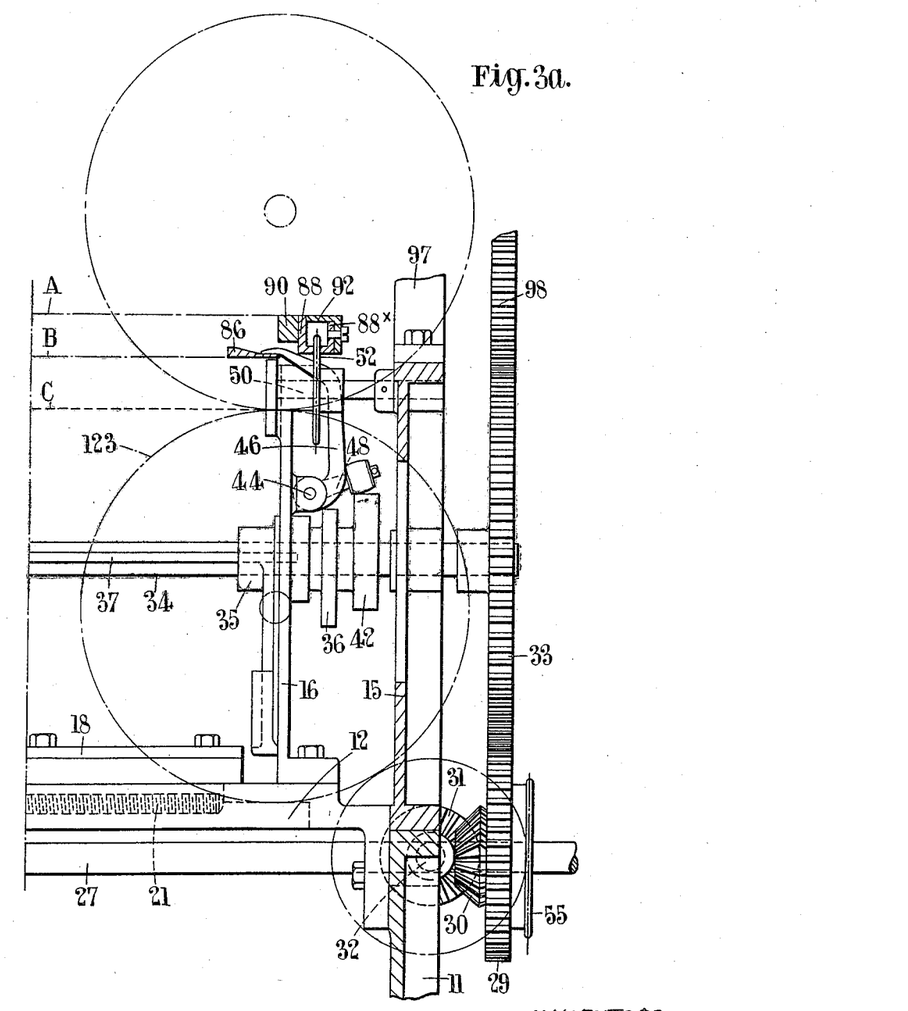
Figure 4:
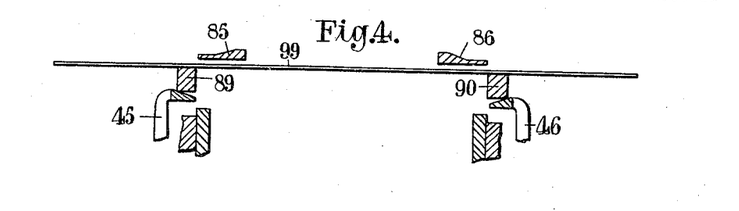
Figures 4, 5, 6 and 7 are diagrammatic illustrations of folding mechanism and actions.

The blank on being drawn off the first station folding blades, is forwarded to the second folding station by means of forwarding rollers 100, 101, 102 and 103 and 104 passing over the inclined guide plate 173 (Figure 1). Guides 174, and 175 supported by brackets 176 guide the partly folded blank on to the second folding station and under folding blades 136 and 137 stops (not shown) supported on frame 116, registering the blank so that the creasing lines of the flaps are exactly under the edges of folding blades 136, 137. These blades are then depressed by the operation of cams 129$^{\times}$ and 132 the end flaps of envelope being thereby turned up square. Side folders 141 and 142 then in turn operate to close the turned up flaps over the folding blades 136 and 137 and complete the operation in time to allow of the withdrawal of the blank from the folding blades by means of arc castings 147 and 148, the forwarding rollers 149, 150, 151 and 152 progressing the completely folded blank to delivery. The three planes of operation are shown clearly in Figures 3$^{a}$. A indicates the plane of approach of the blank to first folding station, B the plane of first depression and C the plane of second depression and level of delivery line which latter represents the meeting point of the peripheries of the arc castings 127, 129 and 147, 148.

Delivery may be into a trough capable of adjustment to suit various sizes, or the envelopes may be delivered on to a continually or periodically advancing band, or by any of the other means well known to those engaged in the art.

The delivery may if desired be effected by a device adapted to complete the pressure on any of the flaps that may have received gum prior, to or when passing through the machine while still keeping the sealing flap open. The envelope may subsequently be passed into a conveyor, where it remains until the gum on the sealing flap has become dry.

The gumming of the sealing flap may be effected after the envelope has been completely folded, the flap being raised, as the folded envelope leaves the folding mechanism, gummed, and then passed through a drier.

Although we have described and illustrated a construction of envelope folding machine it will be readily apparent to those skilled in the art that the invention may be applied to other constructions of envelope folding mechanism.

We make no claim to a delivery or gumming device.

Having now particularly described and ascertained the nature of our said invention and in what manner the same is to be performed, we declare that what we claim is:—

1. In a machine for folding envelope blanks and the like, the combination of a mechanism for forwarding the blanks to the first or side flap folding station, means at that station adapted to depress or lower the blank to a plane lower than that of the forwarding mechanism, means for effecting the folding of said flaps, means for transferring the blanks to the second or end flap folding station, means at said second station adapted to depress or lower the partly folded blanks to a plane below that of the first folding station, means for effecting the said second folding and means for transferring the completely folded blanks and delivering the same.

2. In a machine for folding envelope blanks and the like, the combination of a mechanism for forwarding the blanks to the first or side flap folding station, means at that station adapted to depress or lower the blanks to a plane below that of the forwarding mechanism, means for folding said flaps, means for transferring the blanks to the second or end flap folding station, means for laterally adjusting the folding means at the said first folding station to vary the size of the folded blank, means at the second folding station adapted to depress or lower the partly folded blanks to a plane below that of the first folding station, means for folding said end flaps, means for transferring the completely folded blanks and delivering the same and means for laterally adjusting the folding means at said second folding station.

3. In a machine for folding envelope blanks and the like, the combination of a mechanism for forwarding the blanks from the initial feeding means to the first or side flap folding station, means at that station for depressing or lowering the blank to a plane lower than that of the forwarding mechanism, means for turning up the said flaps, means for causing said flaps to overlap the body of the blank and to embrace the depressing means, mechanism for transferring the blanks from said depressing and folding means to the second folding station, means for depressing or lowering the blanks in said second station to a plane below that of the depression at the first folding station, means for turning up the said flaps, means for causing said flaps to overlap the body of the blank and embrace the depressing means, mechanism for transferring the blanks from said second depressing and folding means and means for delivering the completely folded blanks.

4. In a machine for folding envelope blanks and the like the combination of mechanism for forwarding the blanks from the initial feeding means to the first or side flap folding station, means at that station for depressing the blank to a plane lower than that of the forwarding mechanism, means for turning up the said flaps from said plane of depression, means for folding said flaps to a position overlapping the body of the blank and embracing the depressing means, means for transferring the blank from said depressing and folding means to the second or end flap folding station, means at the first folding station for laterally adjusting the folding means to vary the size of the folded blank, means at the said second station for depressing or lowering the blank to a plane below that of depression at the first folding station, means for turning up the said end flaps from said plane of depression at the second folding station, means for folding said flaps to overlap the body of the blank and embrace the depressing means, means for transferring the blank from the said second depressing means, means for delivering the completely folded blank and means for laterally adjusting the folding means at said second folding station.

5. In a machine for folding envelope blanks and the like, the combination of means for forwarding the blanks at one plane, means adapted to depress the blanks to a second plane and to partially fold the blank during transfer from the one plane to the other, means for forwarding the partly folded blanks from said second plane, folding mechanism arranged and operating at right angles to said depressing and partial folding means, means in said second folding mechanism adapted to depress the partly folded blanks to a third plane and to complete the folding of the blanks during the transfer from the second to the third plane, means for forwarding the completely folded blanks, from said folding means and means in operative relation with said last mentioned forwarding means for delivering the completely folded blanks.

6. In a machine for folding envelope blanks and the like, the combination, with the folding mechanism of a laterally movable or adjustable supporting framework, a revolubly mounted bush casting, a shaft for driving said bush casting, a keyway in the casting, a splined key for operation relatively with said keyway, a boss or stop on the arc casting for limiting movement on one side and another stop or folder cam for limiting movement on the other side.

7. In a machine for folding envelope blanks and the like, the combination, with the folding mechanism of a laterally movable or adjustable supporting framework, a screwed shaft and a hand wheel in operative relation with the framework at each folding station for controlling said framework.

8. In a machine for folding envelope blanks and the like, the combination of blank forwarding means, a first or side flap folding mechanism, means in said mechanism for depressing the blank, means for bending the side flaps, means for turning or folding the said flaps against the body of the blank into position to embrace the depressing means, an actuating screw at said first folding station, means for removing the blank and transferring or forwarding the same to the second or end flap folding station, means at said second station for again depressing the blank, means for bending the flaps, means for turning said flaps so as to overlap the body of the blanks and embrace the depressing means, an actuating screw at said second folding station, means for withdrawing the blank from the second depressing means and means for delivering the completely folded blanks.

In witness whereof we have hereunto subscribed our signatures.

NORBERT CARLTON.
ALBERT KERSTEN.

Witnesses:
THEO. W. KENNA,
FRANCIS H. CONLAND.